United States Patent [19]

Raemisch et al.

[11] 4,341,123
[45] Jul. 27, 1982

[54] TORQUE-MEASURING TAPE CASSETTE

[75] Inventors: Reinhard Raemisch, Reichelsheim; Arthur H. Hoffmann, Mannheim, both of Fed. Rep. of Germany

[73] Assignee: Koenig-Electronic Friedrich W. Koenig, Reichelsheim, Fed. Rep. of Germany

[21] Appl. No.: 171,418

[22] Filed: Jul. 22, 1980

[30] Foreign Application Priority Data

Jul. 28, 1979 [DE] Fed. Rep. of Germany ....... 2930739
Aug. 10, 1979 [DE] Fed. Rep. of Germany ....... 2932526

[51] Int. Cl.³ .......................... G01L 3/16; G01L 5/06
[52] U.S. Cl. .............................. 73/862.09; 73/862.44; 73/862.47
[58] Field of Search .......... 73/862.08, 862.09, 862.19, 73/862.32, 862.44, 862.47

[56] References Cited

U.S. PATENT DOCUMENTS

| | | | |
|---|---|---|---|
| 3,210,994 | 10/1965 | Saxl | 73/862.47 |
| 3,329,013 | 7/1967 | Beindorf et al. | 73/862.47 |
| 3,771,358 | 11/1973 | Yamano | 73/862.32 |
| 3,942,367 | 3/1976 | Thompson | 73/862.08 |

FOREIGN PATENT DOCUMENTS

| | | | |
|---|---|---|---|
| 1919371 | 12/1970 | Fed. Rep. of Germany | 73/862.44 |
| 2336501 | 2/1975 | Fed. Rep. of Germany | 73/862.08 |

*Primary Examiner*—Charles A. Ruehl
*Attorney, Agent, or Firm*—Michael J. Striker

[57] ABSTRACT

A cassette for measuring the torque output of the tape drive of a cassette recorder and/or player has a housing with two hubs, to which the ends of a tape are connected. A slide is displaceable against the force of a spring and carries a tape-deflecting roller about which the tape is trained. The slide carries several pointers for movement with it. Several different exposed faces of the cassette housing have respective dials provided on or at them, and each pointer cooperates with one of these dials. Pull applied to the tape as a result of hub rotation by the tape drive of a machine being tested, causes the slide to be displaced from its rest position. The degree of this displacement is a function of the applied torque which can be read off all of the several dials. At least one of the dials will always be exposed for observation, irrespective of what particular type of cassette machine is being tested. Various modifications are also described herein.

10 Claims, 2 Drawing Figures

TORQUE-MEASURING TAPE CASSETTE

BACKGROUND OF THE INVENTION

This invention relates to a tape cassette, and more particularly to a torque-measuring tape cassette.

Still more specifically, the invention relates to a torque-measuring tape cassette for use in cassette recorders and/or players.

Tape cassettes for use in cassette recorders and/or players have two hubs one or the other of which is rotated by a cassette machine capstan, depending upon whether the tape is being advanced or rewound. To achieve proper operation—e.g. to avoid sound distortions due to a tape speed which is either too fast or too slow, or other problems—the torque applied by the capstans in the various tape transport modes (play, record, fast forward, fast rewind) must be within certain predetermined limits. The tape machine manufacturers therefore specify minimum required torque values. When one of these machines undergoes servicing or repair it is, accordingly, necessary to measure the torque output in order to ascertain that the required minimum values are in fact being reached. It is known to use spring-loaded scales for this purpose, but these permit only static measurements to be taken. Moreover, they require the housing to be opened, which is time-consuming and tedious.

A proposal has been made to measure the capstan torque of a tape cassette machine in a simpler manner and during slow tape advancement, by means of a torque-measuring cassette. Such a cassette has a housing and, at the hubs, respective tape-supporting disks or plates each composed of two relatively turnable parts between which a measuring spring is arranged. One of the two parts carries a dial and the other one a pointer; the degree of relative rotation of the two parts is a function of the applied torque, so that this torque can be read off the dial at the value indicated by the pointer.

This is a substantial improvement over the art existing prior to that cassette. However, further improvements are still desirable, for a variety of reasons. For example, during the particularly important measuring of torque in the slow forward modes, the dial turns with the driven tape disk and this makes it more difficult to read the indicated value off the dial. Also, of course, this device can be used only in conjunction with cassette machines in which the tape disk is visible in actual operation; if this part of the cassette is covered in operation of the machine, then the machine must be opened up—or at least the covering part must be dismounted. This is time-consuming. Should the cassette machine be of the type in which only one of the narrow edge faces of the inserted cassette is visible, then any torque-measurement with the known cassette is completely impossible.

SUMMARY OF THE INVENTION

Accordingly, it is an object of the present invention to overcome the disadvantages of the prior art.

A more particular object of the invention is to provide an improved torque-measuring cassette of the type under discussion, which is not possessed of the prior-art disadvantages.

Another, equally important object is to provide an improved torque-measuring cassette wherein the torque applied by the cassette machine can be indicated and read off a dial which is stationary even during operation of the cassette machine in the slow forward tape transportation modes.

A concomitant object is to provide a cassette of the type mentioned above, in which the torque-indicating dial is visually observable even when the cassette is being used with the kind of cassette machine wherein the tape disks are covered and therefore not visible in operation of the machine.

Pursuant to these objects, and to still others which will become apparent hereafter, one feature of the invention resides in a torque-measuring cassette for use in tape machines which, briefly stated, may comprise a housing having a plurality of different exposed sides and a pair of hubs adapted to be rotated by the tape drive of a cassette tape machine; a movable component mounted in the housing for displacement in a path; a deflecting element provided on and displaceable with the movable component; a spring connected to the housing and to the movable component and resisting the displacement of the component; a tape trained about the deflecting element and having spaced ends connected to the respective hubs; a set of dials, including a plurality of dials each located and observable at a different one of the exposed sides; and a set of pointers, including a plurality of pointers each cooperating with one of the dials, one of the sets being provided on the housing and the other of the sets being movable with the component so that displacement of the component effected as a result of rotation applied to a respective hub and consequent pull on the tape, can be read off all of the dials as an indication of measured torque.

A cassette according to the invention can be used in all types of cassette machines, no matter what their construction, since one of the several cassette surfaces provided with the different dials will necessarily always be exposed to view. Another advantage is that the measuring indication, i.e. the indicator movement, will always take place in one and the same direction, irrespective of the particular tape transportation mode at which the cassette machine is being operated, or of the direction of tape movement.

In a particularly advantageous embodiment the cassette housing has a member which can move lengthwise of the housing, i.e. in direction from one towards the other of the tape hubs, and that a tape-reversing roller is mounted on this member for movement therewith, the tape being convoluted about this roller. The spring measuring the torque is connected to a stationary component in the housing and to the movable member and the latter is connected to and/or provided with a plurality of pointers each of which is movable relative to a dial, with each such dial being provided at a different outer surface of the cassette housing. Since the degree of displacement of the movable member, counter to the force of the spring, is a measure of the transmitted torque, the torque can be read off the stationary dials. Moreover, the movable member performs only a simple lengthwise movement; this makes it possible in a structurally very simple manner to indicate this movement simultaneously on all of the several dials so that the applied torque can be read off whichever one of these dial is visually observable in conjunction with a particular cassette machine being used.

Some tape machines—the ones in which the inserted cassette is located parallel to an outer side of the machine—are so arranged that an appropriately positioned dial of the cassette can be observed through the cassette observation window of the machine. In others, in which the cassette is pushed into a loading slot of the machine, one of the dials provided at an edge face of the cassette housing will remain visible for observation. The longitudinal displacement of the movable member can be converted in a simple manner into movement of a pointer along a narrow side (edge face) of the cassette, including even those narrow sides which extend normal to the direction of displacement of the movable member. The pointer deflection rquired for this purpose may be achieved by having the pointer be constituted by—or provided on—a free end of a flexible strip the other end of which is connected to the movable member; this strip is guided in a guideway which deflects it through 90° relative to the path of movement of the movable member.

Naturally, the cassette can be provided with a single dial and pointer, located in such a manner as to be visually observable when used with a specific type of cassette machine. However, at very little additional cost it can be constructed so as to be suitable for truly universal use—i.e. with all types of cassette machines, including those in which only the upper side or one of the edge faces of the cassette are visible in use—by providing it with a dial located in the region of the usual cassette viewing window and with dials at three different narrow sides of the cassette.

If the construction is such that a tape deflecting roller is mounted on the movable element, then it is advantageous to deflect the tape through 180° via this roller. An advantage of such a construction is that the pulling force exerted by the tape upon the spring-loaded movable component—and which is sufficiently analogous to the actual torque to be measured—acts upon the movable element twice in the same direction and this is an aid in keeping the unavoidable measuring error resulting from friction of the movable element, very low.

The spring used to measure the torque is advantageously an expandable spring and the spring mount provided for it at or on the housing should preferably be adjustable lengthwise of the direction of spring elongation, to permit zero-setting of the pointers. Such adjustment is especially simple (and the arrangement compact) if the spring mount is a component which extends normal or substantially normal to the direction of spring elongation and can be bent in this direction; of course, the component must be of a material (e.g. steel or the like) which, once bent, will retain its bent position and not be further bent by the force of the spring.

The indicating elements of the cassette could also be dials which are connected with the movable elements of the cassette and are movable along the various aforementioned outer sides of the cassette. Then it will, of course, be the pointers which are immovably provided on the cassette housing, for example in form of a line on a window of the cassette housing.

The movable element need not specifically be of the type which moves only in a straight lengthwise path. It could also be turnable or swingable about a pivot of the housing. Such a construction offers a particularly simple manner of mounting the element in the housing with freedom of movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
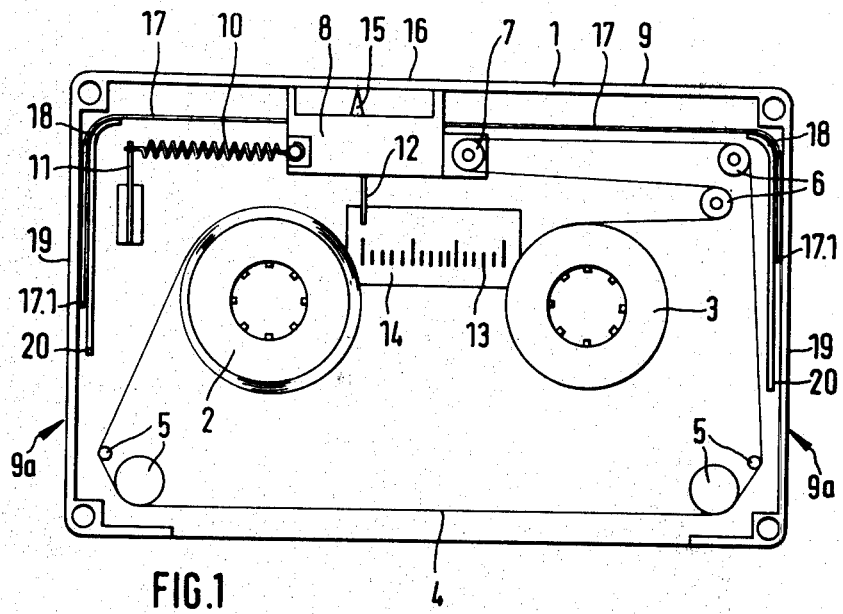
FIG. 1 is a somewhat diagrammatic top plan view of a cassette embodying the invention, with part of the housing omitted.

The torque-measuring cassette illustrated in FIG. 1 has a housing 1 which in the usual manner is composed of a lower and an upper housing section. The latter is omitted in the drawing, so that the two tape disks 2 and 3 are visible which are turnable on or with the respective tape hubs. A tape—which may be a length of actual audio tape or of a different tape having at least the same physical characteristics as audio tape (e.g. with respect to flexibility, extensibility and the like) is connected at its opposite ends to the tape disks 2, 3 and guided about tape-reversing pins 5 of the housing 1, in the manner customarily found in ordinary audio-tape cassettes. In addition, the tape 4 is trained about two rollers 6 which are freely turnably journalled in the housing 1, closely adjacent one another and in one corner region of the housing.

Intermediate (i.e. from one to the other of) these rollers 6 the tape 4 is also trained about a tape reversing roller 7 which is freely turnably mounted on a movable member or slide 8. The latter can move lengthwise along one longitudinal edge 9 of the housing 1. This movement is resisted by a spring 10 having one end connected to the slide 8 and an opposite end which is connected to a spring mount. The spring mount is constituted by a bendable rod 11 to one end of which the spring 10 is connected, whereas the other end of the rod 11 is connected (e.g. clamped) to the housing 1. Rod 11 extends normal or substantially normal to the elongation of spring 10, i.e. to the path of movement of slide 8.

A rigid pointer 12 is connected to (or of one piece with) the slide 8 and in response to movement of the slide 8 travels along a dial 13 which is arranged in the region of the conventional tape-observation window 14 common to all audio-tape cassettes. A similar pointer 15, also rigidly connected to (or of one piece with) the slide 8 travels at the same time along a dial 16 which extends along the longitudinal side 9. It is preferable, although not illustrated, if the housing 1 is provided with a window extending along the side 9 and through which the pointer 15 can be observed. A particularly advantageous construction is obtained if the housing 1 is made of a transparent synthetic plastic material, since this eliminates any need to provide special windows.

The opposite longitudinal ends of the slide 8 are connected with respective flexible strips 17. The corner regions of the housing formed by the juncture of side 9 and narrow sides 9a, are provided with respective guides 18 that deflect the strips 17 through 90° from parallelism with side 9 to parallelism with the respective sides 9a. Each narrow side 9a is provided with a dial 19 corresponding to the dials 13 and 16 and preferably observable through respective windows (not shown) which are, of course, not needed if the housing 1 is of transparent material. The free ends of the strips 17 are designated with reference numeral 17.1 and act as pointers which cooperate with the respective dials 19.

In operation the cassette is installed in a cassette machine the torque of which is to be measured. When the tape drive of the machine (either in forward or reverse mode) exerts a pull upon the tape 4 in the cassette, the thus applied torque is measured as a function of the extent to which the slide 8 is moved from its rest position, counter to the spring 10. This torque can be read off any and all of the several dials 13, 16, 19 on which the torque level is indicated by the position of the pointers 12, 15 and 17.1, respectively. From which of these dials a user reads the information, depends upon the type of cassette machine being tested, i.e. upon which one of the dials is visible to the user when the tape is installed in or on the machine in operative position. However, at least one of the dials will always be visible, no matter what machine is used.

The strips 17 may be guided by e.g. ribs located in the region of the dials 19. The several dials (i.e. the markings making up the dials) may be applied in any suitable manner, for example by screen printing or as transparent self-adhesive tape stickers. The strips 17 should, of course, not only be flexible but also sufficiently stiff so that they do not become deformed intermediate the slide 8 and the guides 18.

In the illustrated embodiment the spring 10 is so chosen that the range of torque measurement is about 0–1.1 Ncm, which permits the torque of all currently commercially available cassette machines to be measured. The length of tape 4 is such that at the customary tape transport speed of 4.76 cm/sec. a running time of about 3 minutes is obtained. This time is long enough to permit the take-up torque to be measured in the play or record mode (dynamic measurement), but allows the length of the tape 4 to be sufficiently short so that the change in the effective tape winding diameter—which occurs during forward or reverse movement of the tape—remains negligibly small.

The invention as discussed herein with reference to an exemplary embodiment, is susceptible of a variety of modifications. For example, the illustrated spring 10 could be replaced with a different type of spring, such as a flexing spring, a spiral spring, a compression spring or a rubber spring (e.g. a rubber band). The slide 8 need not be of the strictly linearly movable type, as shown. It could be replaced with a disk or an arm mounted for pivotal movement. In the case of a disk a mechanical transmission could be utilized to obtain the maximum possible turning angle for the disk. The strips 17 could be replaced by thin, flexible ropes and the dials could be made movable with the slide 8 (or its equivalent) so as to travel past pointers which are fixedly provided on the housing.

Figure 2:
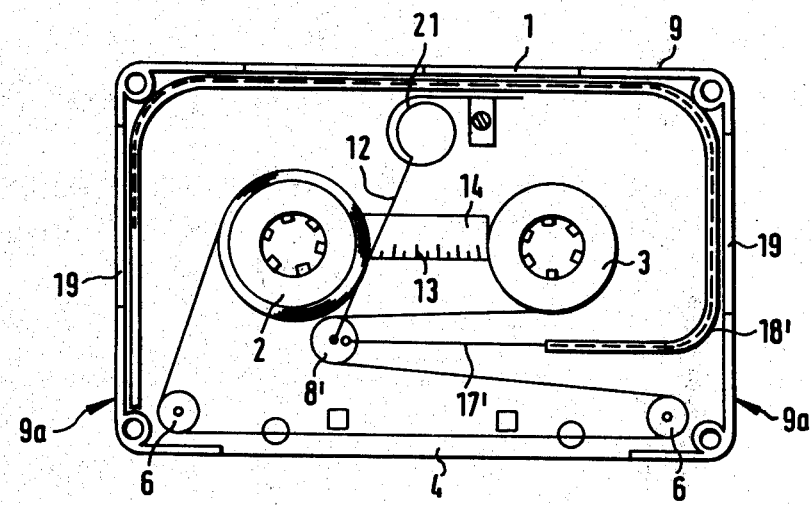
FIG. 2 is a view substantially corresponding to the view of FIG. 1, but showing a cassette in accordance with a further embodiment of the invention.

The torque-measuring cassette shown in FIG. 2 has some parts which are identical to the respective parts of the cassette shown in FIG. 1 and identified by identical reference numerals. Contrary to the cassette of FIG. 1, the tape 4, in the cassette shown in FIG. 2 is trained about a reversing roller 8' which is arranged on a pointer 12. The pointer 12 is turnably supported by a spiral spring 21 which is mounted on the housing 1. The spiral spring 21 not only forms a turnable support for the pointer 12, but also replaces the pulling spring 10 of FIG. 1.

A flexible strip 17' has one end mounted on the reversing roller 8' and is guided in a guide 18'. The guide 18' extends over the sides 9 and 9a of the housing. In the region of the tape-observation window arranged there, a marking provided on the flexible strip 17' can be seen from outside. Thereby the torque can be read not only on the dial 13 in the window 14 of the housing 1, but also at the small sides of the housing 1.

It will be understood that each of the elements described above, or two or more together, may also find a useful application in other types of cassettes differing from the types described above.

While the invention has been illustrated and described as embodied in a torque-measuring cassette, it is not intended to be limited to the detaisl shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A torque-measuring tape cassette, comprising a housing having a plurality of different exposed sides and a pair of hubs adapted to be rotated by the tape drive of a cassette tape machine; a movable component mounted in said housing for displacement in a path; a deflecting element provided on and displaceable with said movable component; a spring connected to said housing and to said movable component and resisting the displacement of said component; a tape trained about said deflecting element and having spaced ends connected to the respective hubs; a set of dials, including a plurality of dials each located and observable at a different one of said exposed sides; and a set of pointers, including a plurality of pointers each cooperating with one of said dials, one of said sets being provided on said housing and the other of said sets being movable with said component so that displacement of said component effected as a result of rotation applied to a respective hub and consequent pull on said tape, can be read off all of said dials as an indication of measured torque.

2. A cassette as defined in claim 1; further comprising a spring-mount in said housing and connected to said spring.

3. A cassette as defined in claim 1, said movable component being a slide movable lengthwise in said housing, and said deflecting element being a freely turnable tape-deflecting roller mounted on said slide.

4. A cassette as defined in claim 3, said set of dials being on said housing and said set of pointers being movable with said slide.

5. A cassette as defined in claim 4, said slide being movable along a longitudinal edge of said housing, and said housing having a portion observable through a tape-observation window of the housing and on which portion one of said dials is provided.

6. A cassette as defined in claim 4, one of said dials being provided at a longitudinal edge of said housing.

7. A cassette as defined in claim 6, said housing also having a pair of spaced-apart transverse edges extending at least substantially normal to said longitudinal edge, at least one of said transverse edges being provided with one of said dials; one of said pointers being provided at a free end of a strip connected to and slidable with said slide in said path; and further comprising means for deflecting said strip from said path to a position substantially paralleling said one dial.

8. A cassette as defined in claim 1; further comprising a spring mount including a bendable bar extending at least substantially normal to said path and having one end portion connected to said housing and another end portion connected to said spring.

9. A cassette as defined in claim 1, wherein said spring is a helical spring.

10. A cassette as defined in claim 1; and further comprising means pivotally mounting said movable component in said housing.

* * * * *